United States Patent
Lee

(10) Patent No.: US 8,337,360 B2
(45) Date of Patent: Dec. 25, 2012

(54) SHIFT CONTROL METHOD OF AUTOMATIC TRANSMISSION AND SHIFT CONTROL SYSTEM THEREOF

(75) Inventor: Jin Soo Lee, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1070 days.

(21) Appl. No.: 12/274,933

(22) Filed: Nov. 20, 2008

(65) Prior Publication Data

US 2009/0264250 A1 Oct. 22, 2009

(30) Foreign Application Priority Data

Apr. 21, 2008 (KR) .................. 10-2008-0036806

(51) Int. Cl.
*B60W 10/06* (2006.01)
*B60W 10/10* (2012.01)

(52) U.S. Cl. ..................................... 477/109

(58) Field of Classification Search .............. 477/54, 477/58, 61, 109
See application file for complete search history.

(56) References Cited

U.S. PATENT DOCUMENTS
2006/0128522 A1* 6/2006 Yeo ........................ 477/109

FOREIGN PATENT DOCUMENTS
JP 2008-32156 A 2/2008

* cited by examiner

*Primary Examiner* — Edwin A Young
(74) *Attorney, Agent, or Firm* — Morgan, Lewis & Bockius LLP

(57) ABSTRACT

A shift control method of an automatic transmission may include: detecting a slope of a turbine speed in a case in which a shift is performed; quickly reducing an electric throttle opening by a jumping amount of an electric throttle opening according to the slope of a turbine speed; gradually reducing the electric throttle opening; and gradually increasing the electric throttle opening.

18 Claims, 5 Drawing Sheets

SHIFT CONTROL METHOD OF AUTOMATIC TRANSMISSION AND SHIFT CONTROL SYSTEM THEREOF

CROSS-REFERENCE TO RELATED APPLICATION

The present application claims priority to Korean Patent Application No. 10-2008-0036806 filed Apr. 21, 2008, the entire contents of which are incorporated herein for all purposes by this reference.

BACKGROUND OF THE INVENTION

1. Field of the Invention

The present invention relates to a shift control method of an automatic transmission and a shift control system thereof. More particularly, the present invention relates to a shift control method of an automatic transmission and a shift control system thereof that improves responsiveness to a kick-down shift.

2. Description of Related Art

Generally, one friction element is released and another friction element is engaged according to clutch-to-clutch shift control. In this case, the slope of a turbine speed is controlled by means of hydraulic pressure of an off-going element, and thereby also is a shift.

As shown in FIG. 5, if a shift signal is detected, the hydraulic pressure of the off-going element is gradually increased after being quickly reduced such that the slope of the turbine speed is controlled. At this stage, hydraulic pressure of an on-coming element is maintained at a stand-by pressure after being pre-charged. After that, the hydraulic pressure of the off-going element is quickly reduced and the hydraulic pressure of the on-coming element is quickly increased to engaging pressure when a synchronizing point is reached, and thereby the shift is completed.

Meanwhile, during a specific skip-shifting process, two frictional elements may be released and two other frictional elements may be engaged. However, it is understood that shift control releasing two frictional elements and engaging two other frictional elements is difficult to be realized.

Therefore, much research into a situation in which two easily controllable shifting processes are successively preformed in the case of a skip shift has been conducted. That is, after a first shift where one off-going element is released and one on-coming element is engaged is completed, a second shift where another off-going element is released and another on-coming element is engaged is performed.

However, since two shifting processes are successively performed, the shifting time may be long and the shift feel may be deteriorated. Since the second shift is performed by means of the hydraulic pressure of the second off-going element after the first shift is performed by means of the hydraulic pressure of the first off-going element, shift time may be retarded and shift responsiveness may be deteriorated.

To solve such problems, many shift control methods of an automatic transmission where first and second shifts are overlapped have been researched. However, in a case in which many shift processes are overlapped, such as a shift from an eighth forward speed to a second forward speed, the shift time may be long and shift responsiveness may be deteriorated even if the shift is performed according to such a shift control method.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a shift control method of an automatic transmission and a shift control system thereof having advantages that a smooth shift is possible as a consequence of engine torque being reduced and an on-coming element being controlled during a kick-down shift.

In an aspect of the present invention, a shift control method of an automatic transmission, may include determining a predetermined shift condition is satisfied, detecting a slope of a turbine speed in a case in which the predetermined shift condition is satisfied, quickly reducing an electric throttle opening by a jumping amount of the electric throttle opening according to the slope of the turbine speed, gradually reducing the electric throttle opening, and/or gradually increasing the electric throttle opening.

The electric throttle opening may be quickly reduced at a shift begin point. The shift begin point may be determined to be a point where the turbine speed thereof is faster than that of a first shift speed by a first predetermined turbine speed. The first predetermined turbine speed may be approximately 1% to approximately 5% of the first shift speed.

The jumping amount may be determined by a depressed amount of an accelerator pedal.

The electric throttle opening may be gradually reduced by a first predetermined slope from the shift begin point to a transient point where the sign of the slope of turbine speed is changed after the shift begin point.

The electric throttle opening may be gradually increased by a second predetermined slope from the transient point to a second synchronizing point that is later than a first synchronizing point with a predetermined time period.

The predetermined time period may be approximately 80 milliseconds to 120 milliseconds.

The first synchronizing point may be determined to be a point where the turbine speed thereof is slower than that of a second shift speed by a second predetermined turbine speed. The second predetermined turbine speed may be approximately 1% to approximately 5% of the second shift speed.

The shift may be performed by only controlling hydraulic pressure of an on-coming element.

In another aspect of the present invention, a shift control system of an automatic transmission, may include a shift determination module for determining whether a predetermined shift condition is satisfied, a calculation module for calculating a slope of a turbine speed and a jumping amount of an electric throttle opening in a case in which the predetermined shift condition is satisfied, and/or a control unit for performing a shift by controlling a hydraulic pressure control unit, and for controlling an electric throttle opening based on the jumping amount of the electric throttle opening calculated at the calculation module and on progress of the shift.

The control unit may quickly reduce the electric throttle opening by the jumping amount of the electric throttle opening at a shift begin point. The control unit may gradually reduce the electric throttle opening by a first predetermined slope from the shift begin point to a transient point. The control unit may gradually increase the electric throttle opening by a second predetermined slope from the transient point to a second synchronizing point that is later than a first synchronizing point by a predetermined time period. The control unit may perform a shift by only controlling hydraulic pressure of an on-coming element.

In further another aspect of the present invention, a shift control system of an automatic transmission may realize a shift by controlling a plurality of friction elements including an on-coming element and an off-going element, wherein the shift control system may include a control unit that reduces engine torque during a shift such that the shift is performed by only controlling the on-coming element.

The control unit may gradually reduce the engine torque after quickly reducing the engine torque by a predetermined value at a shift begin point.

The control unit may gradually increase the engine torque from a transient point.

The predetermined value may be defined as a function of a slope of the turbine speed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
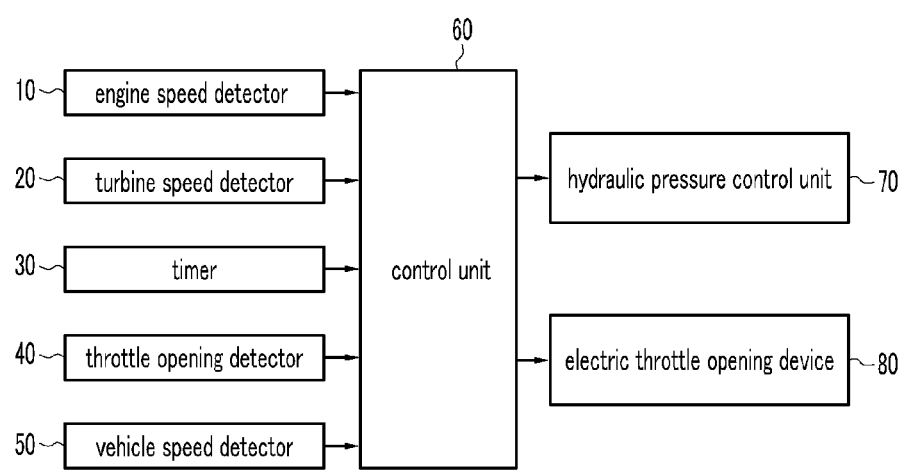
FIG. 1 is a block diagram showing a shift control system of an automatic transmission according to an exemplary embodiment of the present invention.

FIG. 1 is a block diagram showing a shift control system of an automatic transmission according to an exemplary embodiment of the present invention.

As shown in FIG. 1, a shift control system of an automatic transmission according to various embodiments of the present invention includes an engine speed detector 10, a turbine speed detector 20, a timer 30, a throttle opening detector 40, a vehicle speed detector 50, a control unit 60, a hydraulic pressure control unit 70, and an electric throttle opening device 80.

An engine speed detector 10 is mounted on a crankshaft. The engine speed detector 10 detects rotation speed of an engine from a phase angle change of the crankshaft, and transmits a signal corresponding thereto to the control unit 60.

The turbine speed detector 20 detects turbine speed that is operated as input torque of the automatic transmission, and transmits a signal corresponding thereto to the control unit 60.

The timer 30 is electrically connected to the control unit 60, detects a time lapse during which a shift is performed by control of the control unit 60, and transmits a signal corresponding thereto to the control unit 60.

The throttle opening detector 40 detects opening of a throttle valve that is operated according to an operation of an accelerator pedal, and transmits a signal corresponding thereto to the control unit 60.

The vehicle speed detector 50 detects vehicle speed, and transmits a signal corresponding thereto to the control unit 60.

The control unit 60 can be realized by one or more processors activated by a predetermined program, and the predetermined program can be programmed to perform each step of a shift control method of an automatic transmission according to various embodiments of this invention.

The control unit 60 receives the engine speed signal, the turbine speed signal, the time signal, the throttle opening signal, and the vehicle speed signal respectively from the engine speed detector 10, the turbine speed detector 20, the timer 30, the throttle opening detector 40, and the vehicle speed detector 50.

The control unit 60 generates a shift control signal corresponding to the received signals and transmits the shift control signal to the hydraulic pressure control unit 70. The control unit 60 calculates the slope of a turbine speed and a jumping amount of electric throttle opening a according to the slope of the turbine speed.

In addition, the control unit 60 includes a map table. The map table includes throttle openings corresponding to the vehicle speed at respective shift speeds. Therefore, the control unit 60 calculates a target shift speed based on the throttle opening signal and the vehicle speed signal, and determines whether a shift condition is satisfied.

In addition, the map table includes jumping amounts of the electric throttle opening a according to the slope of turbine speeds.

The throttle opening corresponding to the vehicle speed and the jumping amount of electric throttle opening a stored in the map table can be preferably set according to a vehicle and/or an engine that applies a shift control method of an automatic transmission and a system thereof according to various embodiments of the present invention by a person of ordinary skill in the art.

The hydraulic pressure control unit 70 receives the shift control signal from the control unit 60, and controls hydraulic pressure supplied to respective off-going and on-coming elements. The hydraulic pressure control unit 70 includes at least one control valve and solenoid valve that control the hydraulic pressure supplied to respective off-going and on-coming elements.

The electric throttle opening device 80 is controlled by the control unit 60 and controls torque of an engine. That is, if the opening of the electric throttle opening device 80 becomes large, the engine torque also becomes large. On the contrary, if the opening of the electric throttle opening device 80 becomes small, the engine torque also becomes small.

Hereinafter, referring to FIG. 2 and FIG. 3, a shift control method of an automatic transmission according to various embodiments of the present invention will be described in detail.

Figure 2:
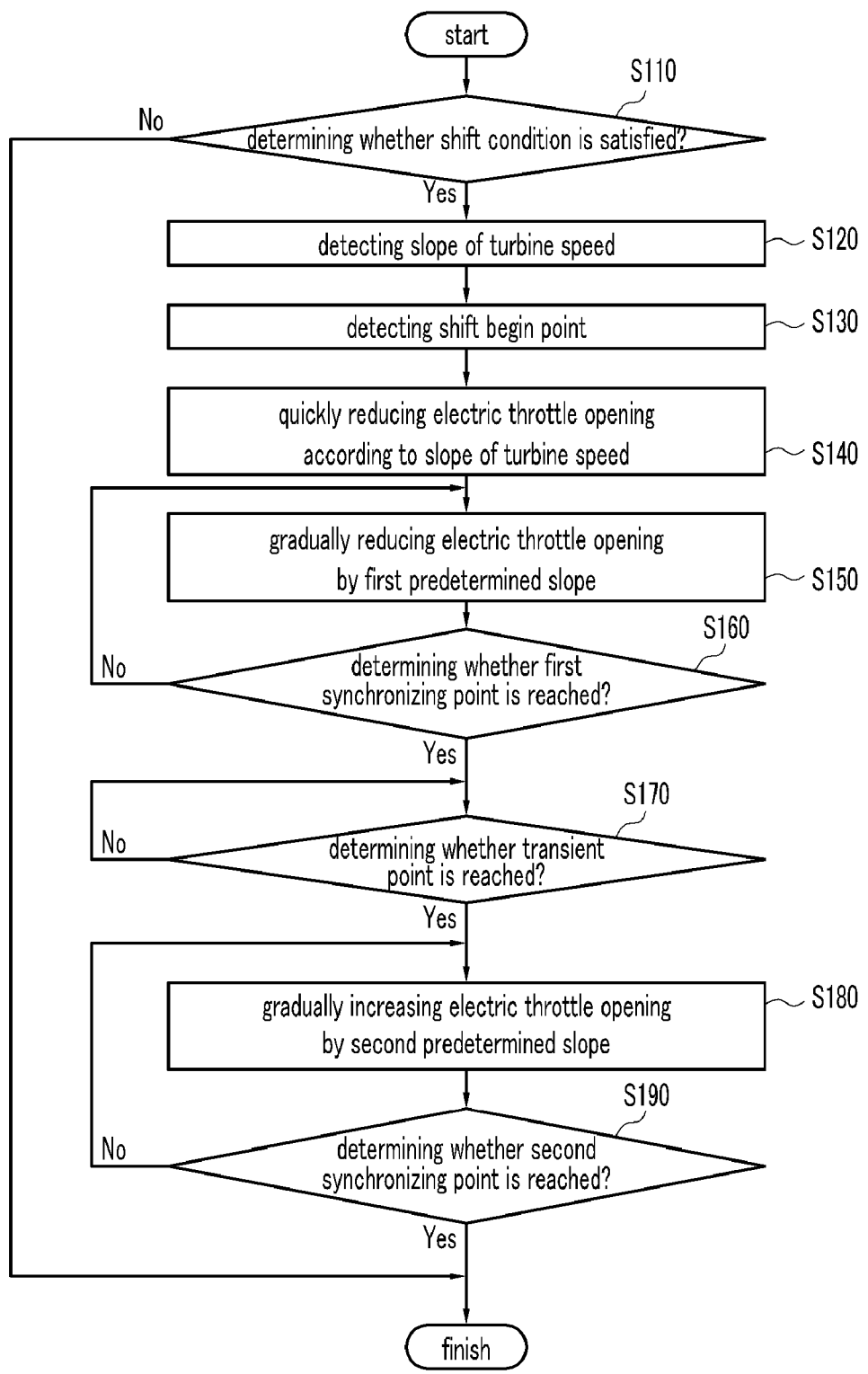
FIG. 2 is a flowchart of a shift control method of an automatic transmission according to an exemplary embodiment of the present invention.
Figure 3:
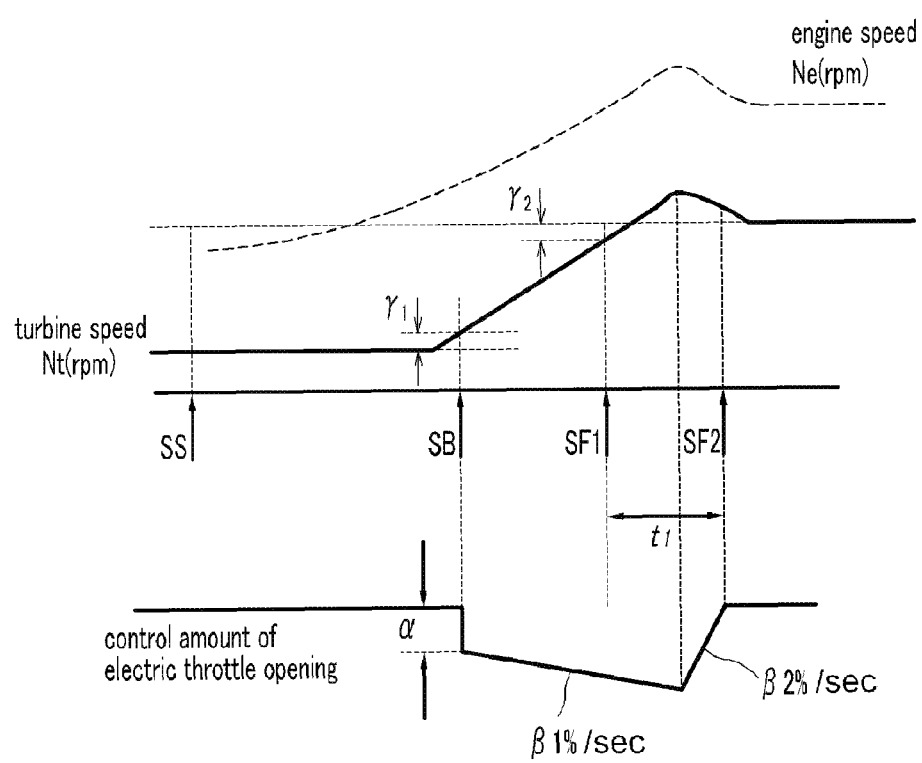
FIG. 3 is a control diagram of an electric throttle opening in a shift control method of an automatic transmission according to an exemplary embodiment of the present invention.

FIG. 2 is a flowchart of a shift control method of an automatic transmission according to various embodiments of the present invention, and FIG. 3 is a control diagram of an electric throttle opening in a shift control method of an automatic transmission according to various embodiments of the present invention.

As shown in FIG. 2 and FIG. 3, in a driving state of the vehicle, the control unit 60 determines whether the shift condition is satisfied based on the signals received respective detectors 10, 20, 40, and 50 at step S110. Such shift condition can be arbitrarily set by a person of ordinary skill in the art.

If the shift condition is not satisfied at step S110, a shift control method of an automatic transmission according to various embodiments of the present invention is finished.

If the shift condition is satisfied at step S110, the control unit 60 detects the slope of the turbine speed based on the turbine speed signal received from the turbine speed detector 20 at step S120. In addition, the control unit 60 generates the shift control signal, and performs the shift by controlling the hydraulic pressure control unit 70 according to the shift control signal.

Meanwhile, a shift start point SS is a point at which the shift condition is satisfied.

Thereafter, the control unit 60 detects a shift begin point SB at step S130. The shift begin point SB may be a point where the turbine speed thereof is faster than that of a first shift speed by a first predetermined turbine speed γ1. In various embodiments of the present invention, the first predetermined turbine speed γ1 may be 1-5% of the first shift speed.

If the shift begin point SB is detected, the control unit 60 quickly reduces the electric throttle opening by the jumping amount of electric throttle opening a according to the slope of turbine speed at step S140. Therefore, the engine torque is reduced.

The jumping amount of electric throttle opening a may be set as a function of the slope of the turbine speed. Additionally, the jumping amount of the electric throttle opening a may be set as a function of a depressed amount of the accelerator pedal.

Then, the control unit 60 gradually reduces the electric throttle opening by a first predetermined slope β1%/sec at step S150. In this case, the engine speed increases gradually.

While gradually reducing the electric throttle opening, the control unit 60 determines whether a first synchronizing point SF1 is reached at step S160. The first synchronizing point SF1 is used for determining whether the shift is performed normally. The first synchronizing point SF1 may be a point where the turbine speed thereof is slower than that of a second shift speed by a second predetermined turbine speed γ2. In various embodiments of the present invention, the second predetermined turbine speed γ2 may be 1-5% of the second shift speed.

If the first synchronizing point SF1 is not reached at step S160, the control unit 60 continues to gradually reduce the electric throttle opening.

If the first synchronizing point SF1 is reached at step S160, the control unit 60 determines whether a transient point is reached at step S170. The transient point is a point where the sign of the slope of the turbine speed is changed from positive to negative.

If the transient point is reached, the control unit 60 gradually increases the electric throttle opening by a second predetermined slope β by 2%/sec so as to prevent the engine torque from being deteriorated at step S180.

The control unit 60 then determines whether a second synchronizing point SF2 is reached so as to prevent run-up at step S190. The second synchronizing point SF2 may be later than a first synchronizing point SF1 by a predetermined time period t1, and the predetermined time period t1 may be easily set so as to prevent a shift shock by a person skilled in the art. The predetermined time period t1 may be 80-120 ms.

If the second synchronizing point SF2 is not reached at step S190, the control unit 60 continues to gradually increase the electric throttle opening.

If the second synchronizing point SF2 is reached at step S190, the shift control method of an automatic transmission according to various embodiments of the present invention is finished.

Figure 4:
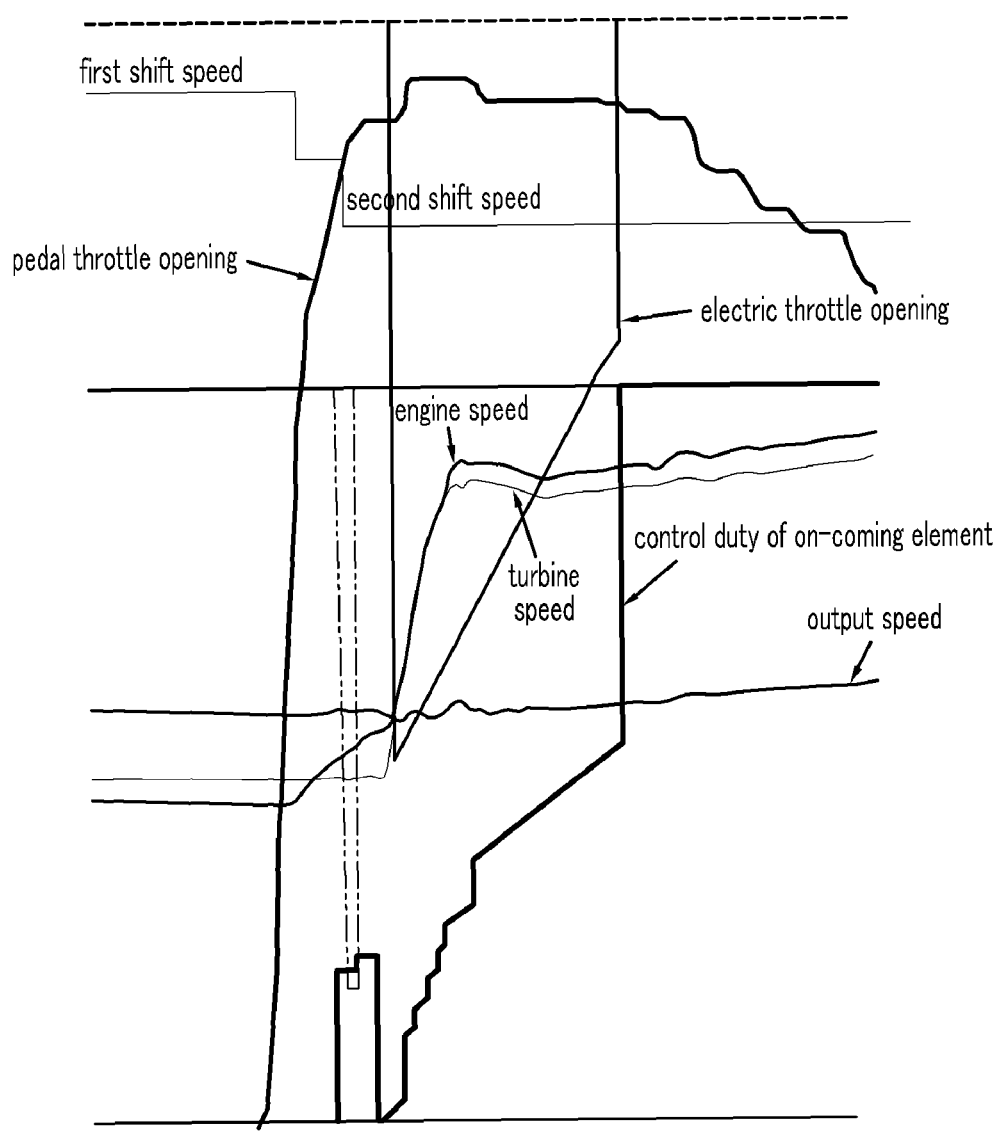
FIG. 4 is a graph showing an engine speed and a turbine speed in a case in which a shift control method of an automatic transmission according to an exemplary embodiment of the present invention is applied.

FIG. 4 is a graph showing an engine speed and a turbine speed in a case in which a shift control method of an automatic transmission according to various embodiments of the present invention is applied.

As shown in FIG. 4, according to various embodiments of the present invention, hydraulic pressure control of the off-going element can be minimized. Instead, the slope of the turbine speed is controlled by means of hydraulic pressure control of the on-coming element. That is, the slope of the turbine speed is controlled by increasing hydraulic pressure of the on-coming element after the electric throttle opening is reduced so as to lower the engine torque.

Figure 5:
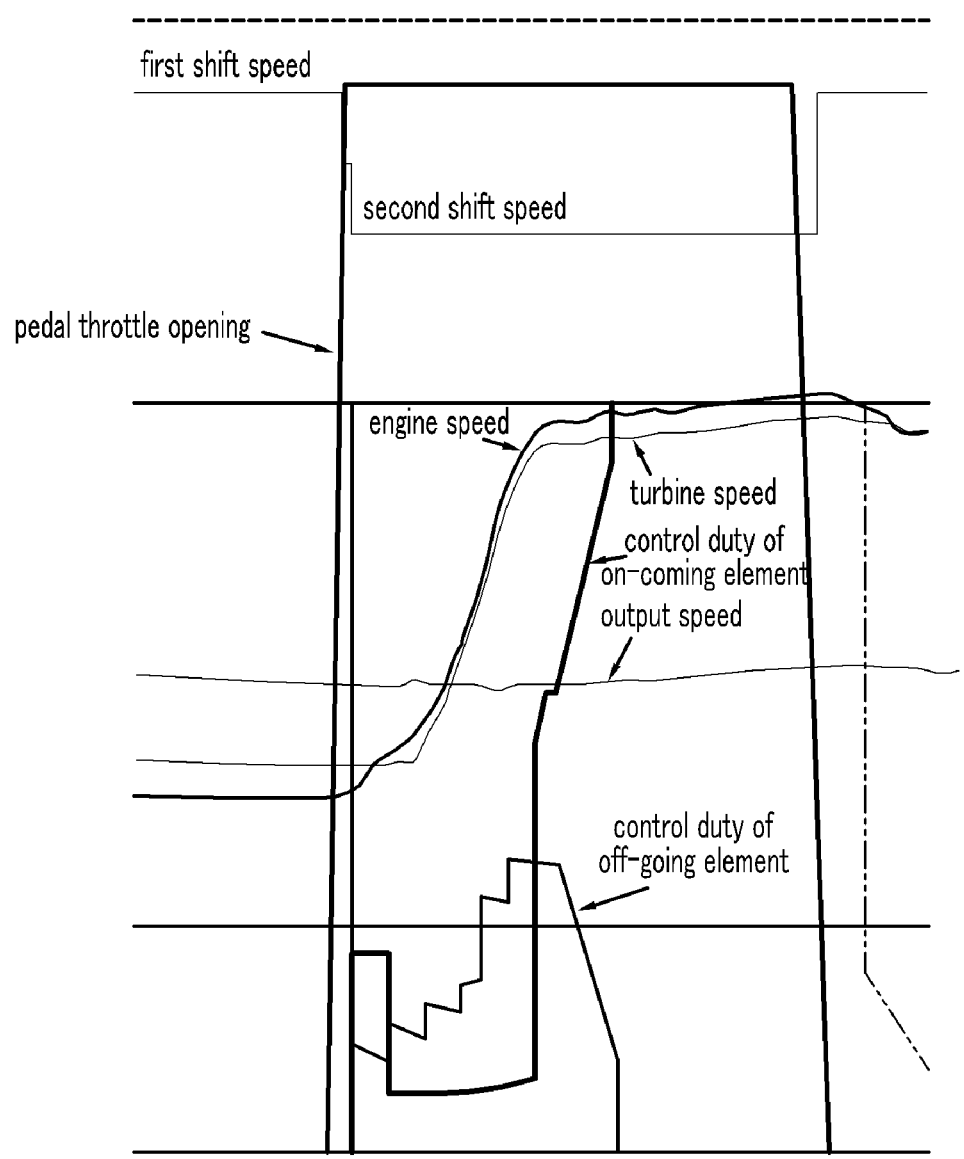
FIG. 5 is a graph showing an engine speed and a turbine speed in a case in which a conventional shift control method of an automatic transmission is applied.

When comparing engine speed and turbine speed in FIG. 4 with those in FIG. 5, it can be seen that shift responsiveness may be improved and shift time may be shortened.

According to the present invention, since engine torque reduction during the shift is performed and the engine torque is recovered after the shift is completed, the shift may be smoothly performed.

In addition, since control of an off-going element is minimized and the shift is performed only by control of an on-coming element, shift feel and shift responsiveness may be improved.

In brief, a shift control method of an automatic transmission and a shift control system, in various aspects of the present invention, have improved shift feel and shift responsiveness as a consequence of control of an off-going element being minimized and a shift being performed only by control of an on-coming element.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method of an automatic transmission, comprising:
   a) determining a predetermined shift condition is satisfied;
   b) detecting a time rate of change of a turbine speed in a case in which the predetermined shift condition is satisfied;

c) reducing an electric throttle opening by a jumping amount of the electric throttle opening according to the time rate of change of the turbine speed;
d) reducing the electric throttle opening slower than the reducing speed of the step c); and
e) increasing the electric throttle opening after step d).

2. The shift control method of claim 1, wherein the electric throttle opening is reduced at a shift begin point.

3. The shift control method of claim 2, wherein the shift begin point is determined to be a point where the turbine speed thereof is faster than that of a first shift speed by a first predetermined turbine speed.

4. The shift control method of claim 3, wherein the first predetermined turbine speed is approximately 1% to approximately 5% of the first shift speed.

5. The shift control method of claim 1, wherein the jumping amount is determined by a depressed amount of an accelerator pedal.

6. The shift control method of claim 1, wherein the electric throttle opening is gradually reduced by a first predetermined time rate of change from a shift begin point to a transient point where a sign of the time rate of change of turbine speed is changed after the shift begin point.

7. The shift control method of claim 1, wherein the electric throttle opening is gradually increased by a second predetermined time rate of change from a transient point to a second synchronizing point that is later than a first synchronizing point with a predetermined time period.

8. The shift control method of claim 7, wherein the predetermined time period is approximately 80 milliseconds to 120 milliseconds.

9. The shift control method of claim 7, wherein the first synchronizing point is determined to be a point where the turbine speed thereof is slower than that of a second shift speed by a second predetermined turbine speed.

10. The shift control method of claim 9, wherein the second predetermined turbine speed is approximately 1% to approximately 5% of the second shift speed.

11. The shift control method of claim 1, wherein the shift is performed by only controlling hydraulic pressure of an on-coming element.

12. A shift control system of an automatic transmission, comprising:

a shift determination module for determining whether a predetermined shift condition is satisfied;
a calculation module for calculating a time rate of change of a turbine speed and a jumping amount of an electric throttle opening in a case in which the predetermined shift condition is satisfied; and
a control unit for performing a shift by controlling a hydraulic pressure control unit, and for controlling the electric throttle opening based on the jumping amount of the electric throttle opening calculated at the calculation module and on progress of the shift,
wherein the control unit gradually reduces the electric throttle opening by a first predetermined time rate of change from a shift begin point to a transient point.

13. The shift control system of claim 12, wherein the control unit reduces the electric throttle opening by the jumping amount of the electric throttle opening at the shift begin point.

14. The shift control system of claim 12, wherein the control unit gradually increases the electric throttle opening by a second predetermined time rate of change from the transient point to a second synchronizing point that is later than a first synchronizing point with a predetermined time period.

15. The shift control system of claim 12, wherein the control unit performs a shift by only controlling hydraulic pressure of an on-coming element.

16. A shift control system of an automatic transmission that realizes a shift by controlling a plurality of friction elements,
wherein the shift control system comprises a control unit that reduces engine torque during a shift such that the shift is performed by only controlling an on-coming element, and
wherein the control unit gradually reduces the engine torque after reducing the engine torque by a predetermined value at a shift begin point.

17. The shift control system of claim 16, wherein the control unit gradually increases the engine torque from a transient point.

18. The shift control system of claim 16, wherein the predetermined value is defined as a function of a time rate of change of a turbine speed.

* * * * *